(12) United States Patent
Shi et al.

(10) Patent No.: US 7,916,629 B2
(45) Date of Patent: Mar. 29, 2011

(54) METHODS AND APPARATUSES FOR PROCESSING AND MANAGING SUBSCRIBER DATA IN TELECOMMUNICATION NETWORK

(75) Inventors: Guangyu Shi, Shenzhen (CN); Hao Wu, Shenzhen (CN); Jian Chen, Shenzhen (CN); Hao Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 172 days.

(21) Appl. No.: 12/338,309

(22) Filed: Dec. 18, 2008

(65) Prior Publication Data
US 2009/0196169 A1 Aug. 6, 2009

(30) Foreign Application Priority Data

Feb. 5, 2008 (CN) .......................... 2008 1 0065362
Feb. 29, 2008 (CN) .......................... 2008 1 0082876

(51) Int. Cl.
*H04L 12/26* (2006.01)
(52) U.S. Cl. ....................................... 370/218; 370/252
(58) Field of Classification Search .......... 370/216–222, 370/252, 253; 707/609, 634, 640, 641, 642, 707/643, 647, 648, 649, 650, 655, 698, 999.001–999.009
See application file for complete search history.

(56) References Cited

U.S. PATENT DOCUMENTS

| 2007/0050365 | A1 | 3/2007 | Laitinen et al. |
| 2007/0232267 | A1 | 10/2007 | Pan |
| 2008/0005334 | A1 | 1/2008 | Utard et al. |
| 2009/0254561 | A1 | 10/2009 | Shao et al. |

FOREIGN PATENT DOCUMENTS

| CN | 1996955 A | 7/2007 |
| CN | 101043695 A | 9/2007 |
| GB | 2 433 376 A | 6/2007 |
| WO | WO 01/38983 A2 | 5/2001 |
| WO | WO 2006/056681 A1 | 6/2006 |
| WO | WO 2007/023343 A1 | 3/2007 |

OTHER PUBLICATIONS

Matuszewski et al., "A Distributed IP Multimedia Subsystem (IMS)," *IEEE*, 1-8 (Jun. 2007).
European Patent Office, First Examination Report in European Patent Application No. 08172134.2 (May 20, 2009).
State Intellectual Property Office of the People'S Republic of China, Written Opinion of the International Searching Authority in International Patent Application No. PCT/CN2008/072549 (Jan. 8, 2009).

*Primary Examiner* — Ricky Ngo
*Assistant Examiner* — Gary Mui
(74) *Attorney, Agent, or Firm* — Leydig, Voit & Mayer, Ltd.

(57) ABSTRACT

In order to overcome the defects of the centralized subscriber data management in the telecommunication network, a highly effective distributed data management system for the communication network is achieved in the present invention through improving and applying the distributed Hash table (DHT) technology to subscriber data management in the communication network, which overcomes the deficiencies of the conventional centralized data management. A method for processing subscriber data in a communication network based on a DHT is provided, which includes the following steps. A first node in a DHT overlay network receives subscriber data to be stored. The subscriber data to be stored is regarded as backup data divided into L/K portions. L is greater than or equal to a ratio of a node working bandwidth of a second node to a node recovering bandwidth for data recovery of the second node in the DHT overlay network. K is a total number of backup data and is an integer greater than zero. The subscriber data to be stored is regarded as master data, and the master data and K×L/K divided backup data are, respectively, stored in 1+K×L/K DHT nodes.

20 Claims, 5 Drawing Sheets

METHODS AND APPARATUSES FOR PROCESSING AND MANAGING SUBSCRIBER DATA IN TELECOMMUNICATION NETWORK

CROSS-REFERENCE TO RELATED APPLICATIONS

This application claims priority to Chinese Patent Application No. 200810065362.3, filed Feb. 5, 2008, entitled "Methods and Apparatuses for Processing and Managing Subscriber Data in Telecommunication Network" and Chinese Patent Application No. 200810082876.X, filed Feb. 29, 2008, entitled "Methods and Apparatuses for Processing and Managing Subscriber Data in Telecommunication Network," the contents of both of which are hereby incorporated by reference in their entirety.

FIELD OF THE TECHNOLOGY

The present invention relates to a technical field of telecommunication network, and more particularly, to methods and apparatuses for processing and managing subscriber data in a telecommunication network.

BACKGROUND

A telecommunication network can provide telecommunication services to masses of subscribers. Data of the subscribers, the key data in the telecommunication network, is stored and managed by a special telecommunication equipment. For example, a home location register (HLR) or home subscriber server (HSS) in a mobile communication network integrally stores the subscriber information, such as subscription information, position information, service restriction information, supplementary services, and related parameters.

Since the HLR/HSS is at a key position in the telecommunication network and the current telecommunication network adopts a centralized subscriber data management scheme, there are strict requirements for reliability of the HLR/HSS. In order to meet the requirement for uninterrupted operation, high system configurations, such as local hot backup/local redundancy, plus remote disaster recovery backup, are commonly used. However, as the subscriber data increases, the maintenance cost of the system is significantly increased, the expandability is obviously insufficient, and the load of the network is unbalanced. Therefore, the existing centralized scheme can no longer meet the requirements.

SUMMARY

Accordingly, one embodiment of present invention is directed to methods and apparatuses for processing and managing subscriber data, which can relieve the load of subscriber data storage, so as to solve the defects of the centralized subscriber data management in the telecommunication network.

A method for processing subscriber data in a communication network based on a Distributed Hash Table (DHT) is provided, which includes the following steps.

A first node in a DHT overlay network receives subscriber data to be stored;

The subscriber data is divided into L/K portions; the subscriber data to be stored is regarded as backup data. L is greater than or equal to a ratio of a node working bandwidth of a second node to a node recovering bandwidth for data recovery of the second node in the DHT overlay network. K is a total number of backup data and is an integer greater than zero; and Master data and K×L/K divided backup data are, respectively, sent to 1+K×L/K DHT nodes, and the subscriber data to be stored is regarded as the master data.

A method for querying subscriber data in a communication network based on a DHT is provided, which includes the following steps.

A first node in a DHT overlay network receives a request for querying subscriber data;

A key is obtained, according to the request, and information about DHT nodes storing the subscriber data is obtained according to the key; and Subscriber data corresponding to the key is found, according to the information about the DHT nodes.

A method for updating subscriber data in a communication network based on a DHT is provided, which includes the following steps.

A first node in a DHT overlay network receives a request for updating subscriber data;

A key is obtained according to the request, and information about DHT nodes storing the subscriber data is obtained, according to the key; and Subscriber data corresponding to the key is updated, according to the information about the DHT nodes.

An apparatus for processing subscriber data in a communication network based on a DHT is provided, which includes a receiving unit, a data division unit, and a data storage unit;

The receiving unit is adapted to receive subscriber data to be stored;

The data division unit is adapted to divide the subscriber data to be stored into L/K portions; the subscriber data to be stored is regarded as backup data. L is greater than a ratio of a node working bandwidth of a second node to a node recovering bandwidth for data recovery of the second node in the DHT overlay network. K is a total number of backup data and is an integer greater than zero; and The data storage unit is adapted to send the master data and K×L/K divided backup data to 1+K×L/K DHT nodes, respectively, the subscriber data to be stored is regarded as master data.

An apparatus for querying subscriber data in a communication network based on a DHT is provided, which includes a receiving unit, a computation unit, and a query unit; and The receiving unit is adapted to receive a request for querying subscriber data.

The computation unit is adapted to obtain a key, according to the request, and obtain information about DHT nodes storing the subscriber data, according to the key; and The query unit is adapted to find subscriber data corresponding to the key, according to the information about the DHT nodes.

An apparatus for updating subscriber data in a communication network based on a DHT is provided, which includes a receiving unit, a computation unit, and an update unit;

The receiving unit is adapted to receive a request for updating subscriber data;

The computation unit is adapted to obtain a key, according to the request, and obtain information about DHT nodes storing the subscriber data, according to the key; and The update unit is adapted to update subscriber data corresponding to the key, according to the information about the DHT nodes.

The three apparatuses may be respectively used as independent nodes in a DHT overlay network, and may also be randomly combined into one node in a DHT overlay network.

That is, a node in a DHT overlay network can provide any combination of functions of the above three apparatuses.

A communication equipment is provided, which includes at least one of the following apparatuses: an apparatus for processing subscriber data in a communication network based on a DHT, an apparatus for querying subscriber data in a communication network based on a DHT, and an apparatus for updating subscriber data in a communication network based on a DHT.

The apparatus for storing subscriber data in a communication network based on a DHT includes a receiving unit, a data division unit, and a data storage unit.

The receiving unit is adapted to receive subscriber data to be stored.

The data division unit is adapted to divide the subscriber data to be stored into L/K portions, the subscriber data to be stored is regarded as backup data and L is greater than a ratio of a node working bandwidth of a second node to a node recovering bandwidth for data recovery of the second node in the DHT overlay network. K is a total number of backup data and is an integer greater than zero.

The data storage unit is adapted to send the master data and K×L/K divided backup data to 1+K×L/K DHT nodes, respectively, the subscriber data to be stored is regarded as master data.

The apparatus for querying subscriber data in a communication network based on a DHT includes a receiving unit, a computation unit, and a query unit.

The receiving unit is adapted to receive a request for querying subscriber data.

The computation unit is adapted to obtain a key, according to the request, and obtain information about DHT nodes storing the subscriber data, according to the key.

The query unit is adapted to find subscriber data corresponding to the key, according to the information about the DHT nodes.

The apparatus for updating subscriber data in a communication network based on a DHT includes a receiving unit, a computation unit, and an update unit.

The receiving unit is adapted to receive a request for updating subscriber data.

The computation unit is adapted to obtain a key, according to the request, and obtain information about DHT nodes storing the subscriber data, according to the key.

The update unit is adapted to update subscriber data corresponding to the key, according to the information about the DHT nodes.

The methods and apparatuses for storing, querying, and updating data provided in one embodiment of present invention can achieve distributed storage of telecommunication subscriber data, which significantly improves the parallel recovery by the nodes in the DHT overlay network, reduces the system resources preserved for the maintenance work of the DHT overlay network, improves the robustness of the whole subscriber data storage system, and reduces the unnecessary messages between the nodes in the DHT overlay network.

BRIEF DESCRIPTION OF THE DRAWINGS

The present invention will become more fully understood from the detailed description given herein below for illustration only, and, thus, are not limitative of the present invention.

DETAILED DESCRIPTION

As the Internet involves masses of data, many Internet service providers adopt a distributed, self-organizing, and self-managing P2P technology to construct a self-organizing network system. There is no central server node in a P2P network. Each node may either serve as a server to provide services for other node, or be serviced by other nodes as servers. Therefore, in the P2P network, all peer nodes have the same peer level, and each node is referred to as a peer.

A highly effective and reliable subscriber data storage and management is achieved in one embodiment of present invention by improving the existing P2P technology through studying the characteristics of subscriber data stored in a HLR/HSS in a telecommunication network. Besides the information related to the telecommunication subscribers described in the Background of the Invention, the subscriber data in one embodiment of present invention also includes index information of the subscriber information.

The subscriber data is the information related to the telecommunication subscribers, which may be subscription information, position information, service restriction information, supplementary services, and related parameters of the subscribers; index information of the subscription information, position information, service restriction information, supplementary services, and related parameters of the subscribers; or address information of storage spaces dedicated to the telecommunication subscribers.

The technical solutions of one embodiment of present invention will be described in further detail below with reference to the accompanying drawings.

Currently, according to the characteristics of the subscriber data in the telecommunication network, Distributed Hash Table (DHT)-based key-value storage management schemes are relatively suitable techniques.

For the subscriber data in the telecommunication network, a key in a DHT overlay network is calculated by a Hash function according to one or more subscriber information. The subscriber information may be: (1) phone numbers of the subscribers, (2) SIM card serial numbers of the subscribers, (3) private numbers of the subscribers (for example, ID card), or (4) IP addresses of the subscribers.

In view of the requirement for high reliability of the subscriber data, redundancy backup of the subscriber data needs to be provided in the communication network in such a manner that one node is used to store the master data and a plurality of nodes is used to respectively store the backup data. For ease of description of the technical solutions, the contents of the technical solutions below will be described by taking three data consisting of one master data plus two backup data as an example, and relevant technical solutions are also applicable to other cases of one master data plus multiple backup data.

1. Data Storage

Figure 1:
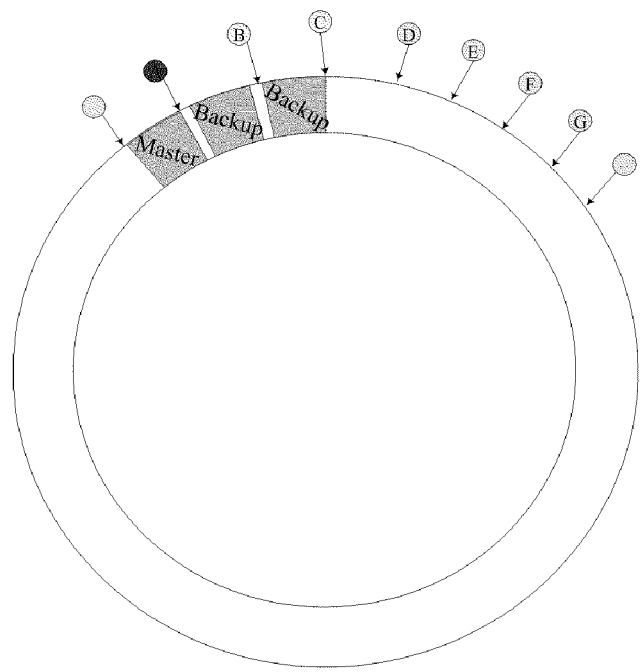
FIG. 1 is a schematic view of a conventional sequential backup mode.

Three data consisting of one master data plus two backup data may be stored in a sequential storage mode (referring to FIG. 1). That is, in the Hash space, each node not only stores one master data of its own, but also needs to successively store the other two backup data in itself and its adjacent node.

Figure 3:
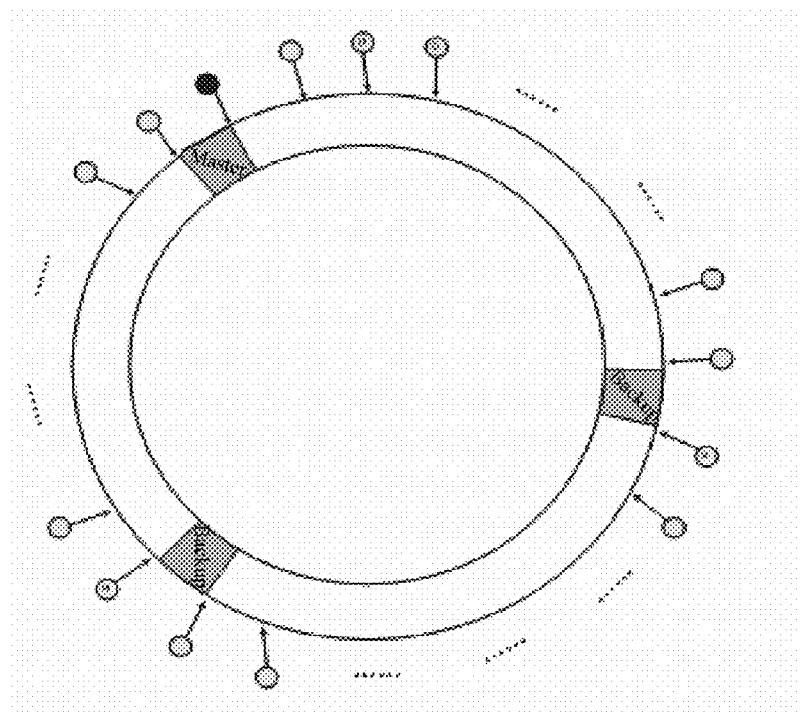
FIG. 3 is a schematic view of a conventional equally partitioned Hash space (fixed offset) backup mode.

The three data may also be stored in an equally partitioned hash space mode (referring to FIG. 3). The nodes storing the backup data and the node storing the master data are located in neighboring 1/(K+1) Hash space. K is a total number of the backup data other than the master data. For example, when K=2, the two backup data are respectively stored in nodes that are offset from the node storing the master data by ⅓ and ⅔ of the Hash space.

Taking sequential storage as an example, referring to FIG. 1, an index stored in A need to be backed up in subsequent B and C. If A fails, a new node has to start downloading portions of data from B and C for sequential backup. In addition, in a conventional sequential storage mechanism, if A fails, the load that A undertakes will be undertaken by B.

FIG. 3 shows a conventional equally partitioned Hash space storage mode. A Peer A stores an area of [Da~Dz]. If the data also consists of one master data and two backup data, the area will be translated and stored at positions of [⅓×HashSpace+Da~⅓×HashSpace+Dz] and [⅔×HashSpace+Da~⅔×HashSpace+Dz]. If peers are uniformly distributed, the two positions are respective peers, which are assumed to be B and C.

One embodiment of present invention provides a novel L data division and storage method hereinafter. A data division and storage method is also provided in an embodiment of the present invention. In this method, data stored in each peer is divided into L/K portions, according to a key. K is a total number of backup data. L is a ratio of a node working bandwidth of a node to a node recovering bandwidth for data recovery of the node. The node working bandwidth refers to a bandwidth provided by the node for normal services, and the node recovering bandwidth refers to a bandwidth provided by the node for recovering request from other nodes.

Figure 2:
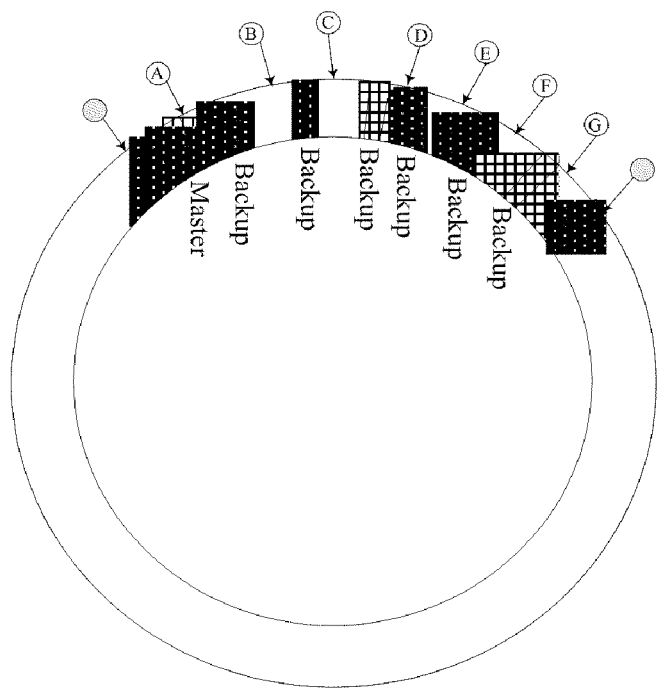
FIG. 2 is a schematic view of an improved sequential backup mode, according to an embodiment of the present invention.
Figure 4:
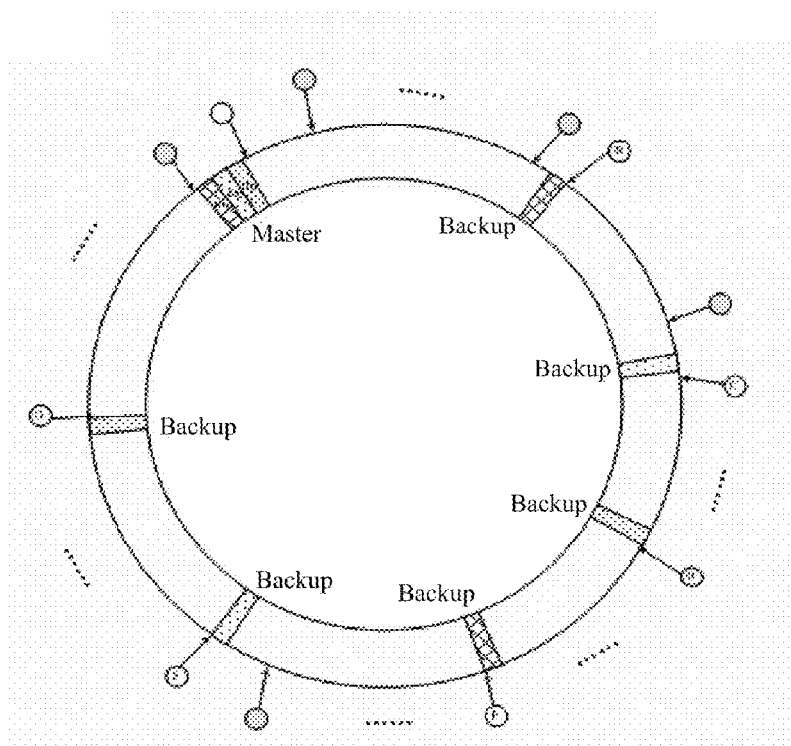
FIG. 4 is a schematic view of an improved equally partitioned Hash space (fixed offset) backup mode, according to an embodiment of the present invention.

Copies are copied in unit of each data or in a sequential manner or an equally spaced manner. In this manner, the copies can be fully recovered by L machines in parallel in the process of data recovery, although the total number of the copies remains unchanged. Meanwhile, each machine only needs to spare 1/L~2/L of bandwidth margin. FIGS. 2 and 4 show improved sequential backup and equally partitioned Hash space backup modes when K=2 and L=6.

A rule-based index mechanism can further be established based on the above L data division and storage method, so as to implement data storage.

In a sequential backup mechanism, if a node is responsible for maintaining data having a key range of 1~6000 (this node is referred to as the node storing the master data), K=2, and L=6, a data storage rule is as follows.

The first backup data is divided into L/K=3 portions; the first adjacent node of the node storing the master data among currently online nodes stores data having a key range of 1~2000; the second adjacent node of the node storing the master data among currently online nodes stores data having a key range of 2001~4000; and the third adjacent node of the node storing the master data among currently online nodes stores data having a key range of 4001~6000. Herein, the meaning of the term "adjacent" varies with different DHTs, and for Chord, the term "adjacent" refers to the first, second, and third nodes on the ring counted from the present node in clockwise direction.

The second backup data is divided into L/K=3 portions; the fourth adjacent node of the node storing the master data among currently online nodes stores data having a key range of 1~2000; the fifth adjacent node of the node storing the master data among currently online nodes stores data having a key range of 2001~4000; and the sixth adjacent node of the node storing the master data among currently online nodes stores data having a key range of 4001~6000. Herein, the meaning of the term "adjacent" varies with different DHTs, and for Chord, the term "adjacent" refers to the fourth, fifth, and sixth nodes on the ring counted from the present node in clockwise direction.

The above rule is summarized as follows: the $i^{th}$ backup data (i is an integer and $1 \leq i \leq K$) is divided into L/K portions, and the $j^{th}$ data piece (j is an integer and $1 \leq j \leq L/K$) is selected to be stored in the $i \times j^{th}$ adjacent node of the node storing the master data among currently online nodes. Alternatively, an offset N is added to IDs of the nodes storing the backup data on the basis of the above rule. That is, the $j^{th}$ data piece is stored in the $i \times j + N^{th}$ adjacent node of the node storing the master data among currently online nodes. N is an integer greater than zero.

In an equally partitioned Hash space backup mechanism, if a node is responsible for maintaining data having a key range of 1~6000 (this node is referred to as the node storing the master data), K=2, and L=6, a hidden data storage rule is as follows.

The first backup data is divided into L/K=3 portions; the first selected node is a node whose node ID is close to a "key=[1~2000]+HashSpace/(K×L+1)" among currently online nodes, and stores data having a key range of 1~2000; the second selected node is a node whose node ID is close to a "key=[2001~4000]+2×HashSpace/(K×L+1)" among currently online nodes, and stores data having a key range of 2001~4000; and the third selected node is a node whose node ID is close to a "key=[4001~6000]+3×HashSpace/(K×L+1)" among currently online nodes, and stores data having a key range of 4001~6000.

For the second backup data, the fourth selected node is a node whose ID is close to a "ID=key=[1~2000]+4×HashSpace/(K×L+1)" among currently online nodes, and stores data having a key range of 1-2000; the fifth selected node is a node whose ID is close to a "key=[2001~4000]+5×HashSpace/(K×L+1)" among currently online nodes, and stores data having a key range of 2001~4000; and the sixth selected node is a node whose node ID is close to a "key=[4001~6000]+6×HashSpace/(K×L+1)" among currently online nodes, and stores data having a key range of 4001~6000.

The above rule is summarized as follows: the $i^{th}$ backup data (i is an integer and $1 \leq i \leq K$) is divided into L/K portions, and the $j^{th}$ data piece (j is an integer and $1 \leq j \leq L/K$) has a key range of [Djl~Djh] and is selected to be stored in a node whose ID is close to a "key=[Djl~Djh]+i×j×HashSpace/(K×L+1)" among currently online nodes. Alternatively, an offset N is added to the entire key ranges of the backup data on the basis of the above rule. That is, the $j^{th}$ data piece is stored in a node whose ID is close to a "key=[Djl~Djh]+N+i×j×HashSpace/(K×L+1)" among currently online nodes. N is an integer greater than zero.

The above rules constitute a hidden index of the system. This hidden index means a corresponding relationship between keys and node IDs. With any key, an ID of a node storing master data of subscriber data corresponding to the key can be obtained, and IDs of nodes storing the backup data can thus be further obtained. In addition, the system may also maintain a displayable index table as required.

2. Data Access Process and Consistency Guarantee

An equally partitioned storage mode involving one master data plus two backup data is adopted in an embodiment of the present invention. Due to the existence of the rule-based hidden index, any node that stores data having this key may function as a coordinator (a coordinator node among peer nodes, which is responsible for coordinating other ordinary nodes to complete related missions together). That is to say, if a node receives a request for operating on subscriber data whose key belongs to its storage range, the node can calculate IDs of nodes that store the other data and function as a coordinator to coordinate the other two nodes to complete related data operations, no matter the subscriber data is master data or backup data.

In an embodiment of the present invention, such a "coordination" mechanism is used to guarantee the data consistency, and is described as follows.

It is assumed that the number of backup data copies is K. Two configurable parameters R and W are defined. R represents a minimum number of copies for achieving a query request, and W represents a minimum number of copies for achieving an update request. R and W are integers, $R+W>K+1$, $1 \leq R \leq K+1$, and $1 \leq W \leq K+1$.

After receiving an update request, the first node automatically serves as a coordinator node, first marks the data as the latest version, stores the data locally, and then sends the data to K nodes in a relevant node preference list. If at least W responses are received, the update is considered to be successful.

Likewise, after receiving a query request, the first node automatically serves as a coordinator node to forward the query request to N nodes in the relevant node preference list, analyze the latest version after receiving R return data, and return the latest version data to a client sending the query request.

Figure 5:
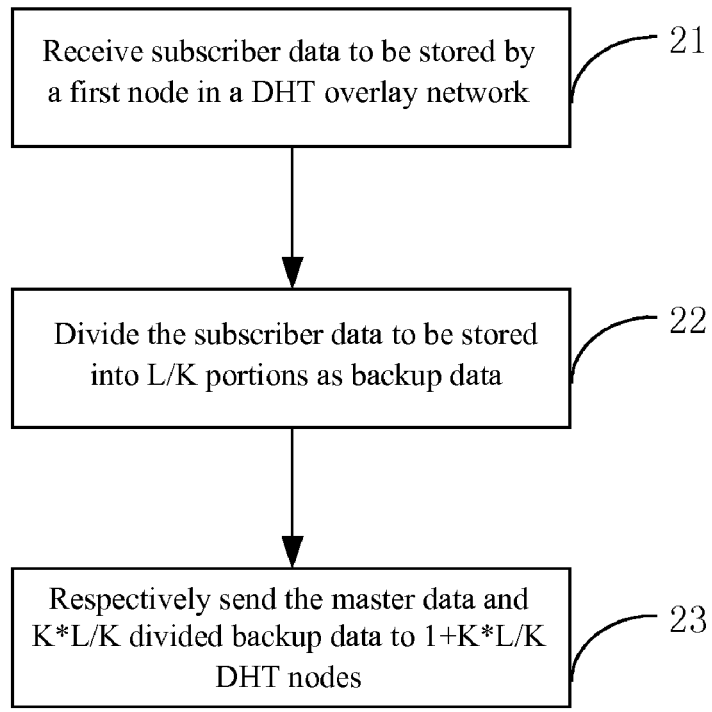
FIG. 5 is a flow chart of A method for processing data, according to an embodiment of the present invention.

A method for processing subscriber data in a communication network is provided in an embodiment of the present invention. Referring to FIG. 5, the method includes the following steps.

In Step 21, a first node in a DHT overlay network receives subscriber data to be stored.

In Step 22, the subscriber data to be stored is divided into L/K portions as backup data. L is greater than or equal to a ratio of a node working bandwidth of a second node to a node recovering bandwidth for data recovery of the second node in the DHT overlay network. The second node can be the first node or another node in the DHT overlay network. K is a total number of backup data and is an integer greater than zero.

In Step 23, the subscriber data to be stored is regarded as master data, and the master data and K×L/K divided backup data are, respectively, sent to 1+K×L/K DHT nodes.

In Step 23, a key is obtained according to the subscriber data to be stored, and an ID of a DHT node close to the key and selected for storing master data of subscriber data corresponding to the key is obtained.

In Step 23, DHT nodes are selected for storing the divided backup data, according to a first rule, a second rule, a third rule, or a fourth rule.

The first rule specifically is that: the $i^{th}$ backup data (i is an integer and $1 \leq i \leq K$) is divided into L/K portions, and the $j^{th}$ data piece (j is an integer and $1 \leq j \leq L/K$) is selected to be stored in the $i \times j^{th}$ adjacent node of the node storing the master data among currently online nodes.

The second rule specifies that: the $i^{th}$ backup data (i is an integer and $1 \leq i \leq K$) is divided into L/K portions, and the $j^{th}$ data piece (j is an integer and $1 \leq j \leq L/K$) is selected to be stored in the $i \times j+N^{th}$ adjacent node of the node storing the master data among currently online nodes, and N is an integer greater than zero.

The third rule specifically is that: the $i^{th}$ backup data (i is an integer and $1 \leq i \leq K$) is divided into L/K portions, and the $j^{th}$ data piece (j is an integer and $1 \leq j \leq L/K$) has a key range of [Djl~Djh] and is selected to be stored in a node whose ID is close to a "key=[Djl~Djh]+i×j×HashSpace/(K×L+1)" among currently online nodes.

The fourth rule specifically is that: the $i^{th}$ backup data (i is an integer and $1 \leq i \leq K$) is divided into L/K portions, and the $j^{th}$ data piece (j is an integer and $1 \leq j \leq L/K$) has a key range of [Djl~Djh] and is selected to be stored in a node whose ID is close to a "key=[Djl~Djh]+N+i×j×HashSpace/(K×L+1)" among currently online nodes, and N is an integer greater than zero.

Step 23 further includes the following steps.

In Step 231, the master data is stored in the node selected for storing the master data, and the K×L/K divided backup data pieces are respectively sent to K×L/K DHT nodes.

In Step 232, return messages from the DHT nodes receiving the backup data pieces are received, and if the number of the received return messages is larger than W, the storage succeeds. W is an integer and $1 \leq W \leq L+1$.

Figure 6:
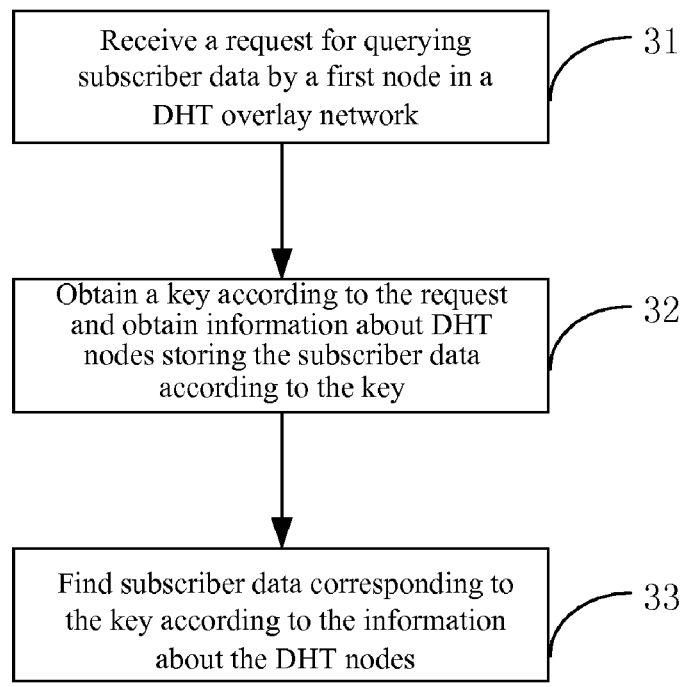
FIG. 6 is a flow chart of a method for querying data, according to an embodiment of the present invention.

A method for querying subscriber data in a communication network is also provided in an embodiment of the present invention. Referring to FIG. 6, the method includes the following steps.

In Step 31, a first node in a DHT overlay network receives a request for querying subscriber data.

In Step 32, a key is obtained, according to the request, and information about DHT nodes storing the subscriber data is obtained, according to the key.

In Step 33, subscriber data corresponding to the key is found, according to the information about the DHT nodes.

Step 32 further includes the following steps.

In Step 321, an ID of a DHT node close to the key and storing master data of subscriber data corresponding to the key is obtained.

In Step 322, IDs of DHT nodes storing the backup data are obtained, according to the ID of the DHT node storing the master data, according to a first rule, a second rule, a third rule, or a fourth rule.

The first rule specifically is that: the $i^{th}$ backup data (i is an integer and $1 \leq i \leq K$) is divided into L/K portions, and the $i \times j^{th}$ adjacent node of the node storing the master data stores the $j^{th}$ data piece (j is an integer and $1 \leq j \leq L/K$) of the $i^{th}$ backup data.

The second rule specifically is that: the $i^{th}$ backup data (i is an integer and $1 \leq i \leq K$) is divided into L/K portions, and the $i \times j+N^{th}$ adjacent node of the node storing the master data stores the $j^{th}$ data piece (j is an integer and $1 \leq j \leq L/K$) of the $i^{th}$ backup data, and N is an integer greater than zero.

The third rule specifically is that: the $i^{th}$ backup data (i is an integer and $1 \leq i \leq K$) is divided into L/K portions, the $j^{th}$ data piece (j is an integer and $1 \leq j \leq L/K$) has a key range of [Djl~Djh], and a node whose ID is close to a "key=[Djl~Djh]+i×j×HashSpace/(K×L+1)" in the current DHT overlay network stores the $j^{th}$ data piece (j is an integer and $1 \leq j \leq L/K$) of the $i^{th}$ backup data.

The fourth rule specifically is that: the $i^{th}$ backup data (i is an integer and $1 \leq i \leq K$) is divided into L/K portions, the $j^{th}$ data piece (j is an integer and $1 \leq j \leq L/K$) has a key range of [Djl~Djh], and a node whose ID is close to a "key= [Djl~Djh]+N+i×j×HashSpace/(K×L+1)" in the current DHT overlay network stores the $j^{th}$ data piece (j is an integer and $1 \leq j \leq L/K$) of the $i^{th}$ backup data, and N is an integer greater than zero.

Step 33 further includes the following steps.

In Step 331, x nodes are selected from the node storing the master data and the nodes storing the backup data, and a request for querying subscriber data is sent to the x nodes (x is an integer and $1 \leq x \leq K+1$).

In Step 332, return messages from the DHT nodes receiving the request for querying subscriber data are received, and if the number of the received return messages is larger than R, the query succeeds. R is an integer and $1 \leq R \leq K+1$.

In Step 333, subscriber data in the return messages obtained by the query is compared, the latest data is regarded as a query result, and the query result is sent.

In Step 33, the information about the nodes includes information about nodes storing master data and backup data.

In Step 33, the query of the subscriber data may be performed by the first node; or performed by the node storing the master data after the first node notifies the node storing the master data; or performed by the nodes storing the backup data after the first node notifies the nodes storing the backup data.

Figure 7:
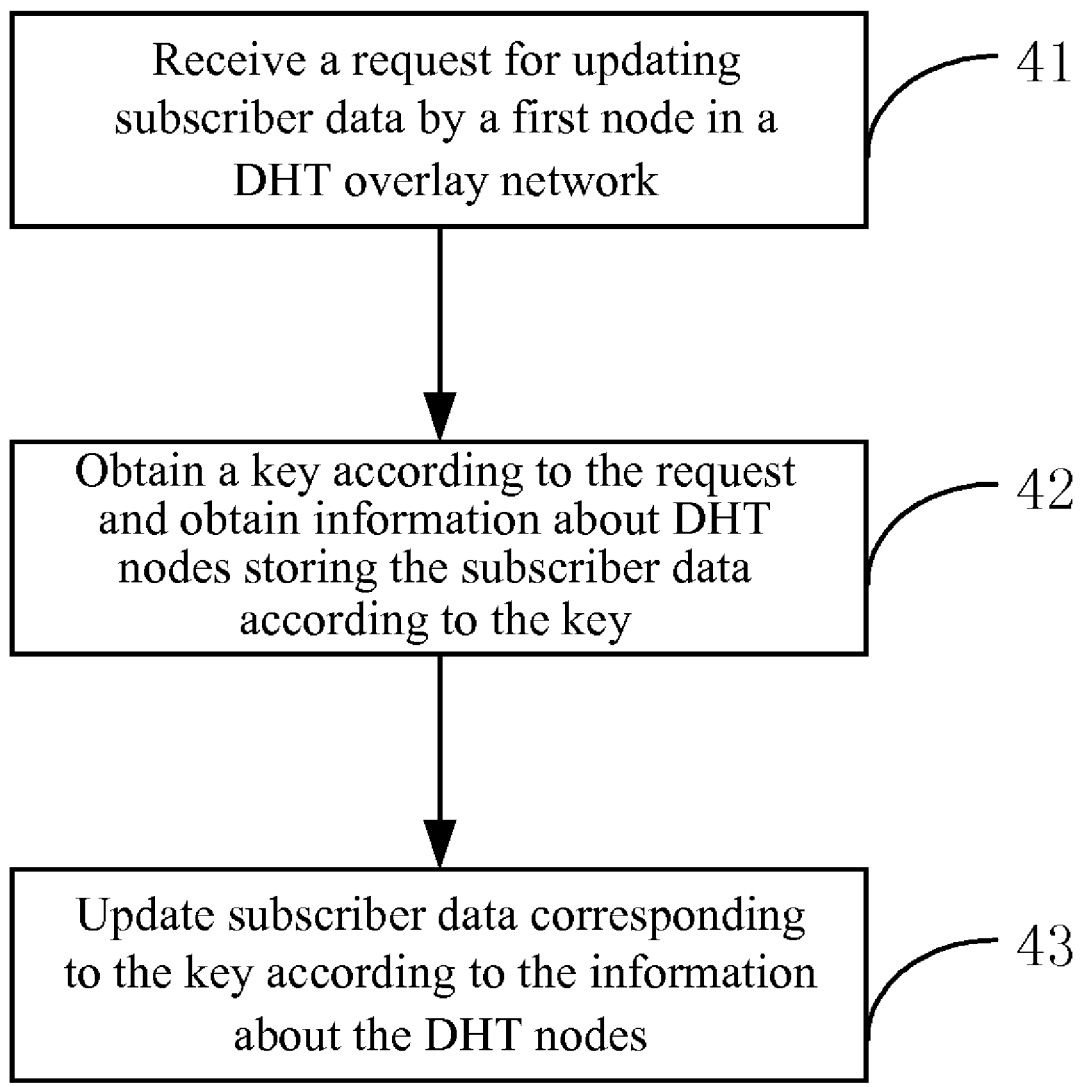
FIG. 7 is a flow chart of a method for updating data, according to an embodiment of the present invention.

A method for updating subscriber data in a communication network is also provided in an embodiment of the present invention. Referring to FIG. 7, the method includes the following steps.

In Step 41, a first node in a DHT overlay network receives a request for updating subscriber data.

In Step 42, a key is obtained, according to the request, and information about DHT nodes storing the subscriber data is obtained, according to the key.

In Step 43, subscriber data corresponding to the key is updated, according to the information about the DHT nodes.

Step 42 further includes the following steps.

In Step 421, an ID of a DHT node close to the key and storing master data of subscriber data corresponding to the key is obtained.

In Step 422, IDs of DHT nodes storing the backup data are obtained, according to the ID of the DHT node storing the master data, according to a first rule, a second rule, a third rule, or a fourth rule.

The first rule specifically is that: the $i^{th}$ backup data (i is an integer and $1 \leq i \leq K$) is divided into L/K portions, and the $i \times j^{th}$ adjacent node of the node storing the master data stores the $j^{th}$ data piece (j is an integer and $1 \leq j \leq L/K$) of the $i^{th}$ backup data.

The second rule specifically is that: the $i^{th}$ backup data (i is an integer and $1 \leq i \leq K$) is divided into L/K portions, and the $i \times j + N^{th}$ adjacent node of the node storing the master data stores the $j^{th}$ data piece (j is an integer and $1 \leq j \leq L/K$) of the $i^{th}$ backup data, and N is an integer greater than zero.

The third rule specifically is that: the $i^{th}$ backup data (i is an integer and $1 \leq i \leq K$) is divided into L/K portions, the $j^{th}$ data piece (j is an integer and $1 \leq j \leq L/K$) has a key range of [Djl~Djh], and a node whose ID is close to a "key= [Djl~Djh]+i×j×HashSpace/(K×L+1)" in the current DHT overlay network stores the $j^{th}$ data piece (j is an integer and $1 \leq j \leq L/K$) of the $i^{th}$ backup data.

The fourth rule specifically is that: the $i^{th}$ backup data (i is an integer and $1 \leq i \leq K$) is divided into L/K portions, the $j^{th}$ data piece (j is an integer and $1 \leq j \leq L/K$) has a key range of [Djl~Djh], and a node whose ID is close to a "key= [Djl~Djh]+N+i×j×HashSpace/(K×L+1)" in the current DHT overlay network stores the $j^{th}$ data piece (j is an integer and $1 \leq j \leq L/K$) of the $i^{th}$ backup data, and N is an integer greater than zero.

Step 43 further includes the following steps.

In Step 431, x nodes are selected from the node storing the master data and the nodes storing the backup data, and a request for updating subscriber data is sent to the x nodes (x is an integer and $1 \leq x \leq K+1$).

In Step 432, return messages from the DHT nodes receiving the request for updating subscriber data are received, and if the number of the received return messages is larger than W, the update succeeds. W is an integer and $1 \leq W \leq K+1$.

In Step 43, the information about the nodes includes information about nodes storing master data and backup data.

In Step 43, the updating of the subscriber data may be performed by the first node; or performed by the node storing the master data after the first node notifies the node storing the master data; or performed by the nodes storing the backup data after the first node notifies the nodes storing the backup data.

In order to achieve the above subscriber data management functions, one embodiment of present invention provides three apparatuses hereinafter. The three apparatuses may be respectively used as independent nodes in a DHT overlay network, and may also be randomly combined into one node in a DHT overlay network. That is, a node in a DHT overlay network can provide any combination of functions of the above three apparatuses.

Figure 8:
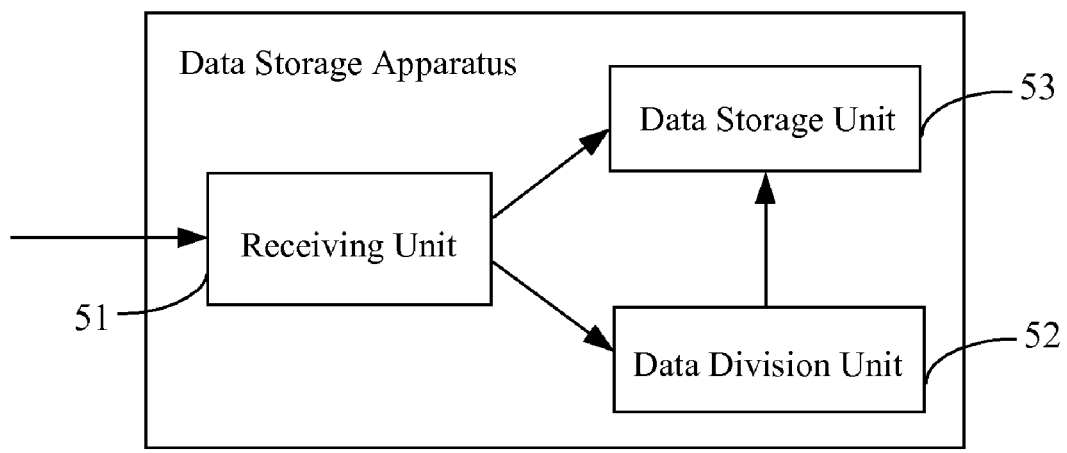
FIG. 8 is a schematic view of an apparatus for processing data, according to an embodiment of the present invention.

An apparatus for processing subscriber data in a communication network is provided in an embodiment of the present invention. Referring to FIG. 8, the apparatus includes a receiving unit 51, a data division unit 52, and a data storage unit 53.

The receiving unit 51 is adapted to receive subscriber data to be stored.

The data division unit 52 is adapted to divide the subscriber data to be stored into L/K portions as backup data. L is greater than or equal to a ratio of a node working bandwidth of a second node to a node recovering bandwidth for data recovery of the second node in the DHT overlay network. The second node is the first node or another node in the DHT overlay network. K is a total number of backup data and is an integer greater than zero.

The data storage unit 53 is adapted to use the subscriber data to be stored as master data and, respectively, send the master data and K×L/K divided backup data to 1+K×L/K DHT nodes.

The data storage unit 53 further includes a first data computation unit, a second data computation unit, and a sending and storage unit.

The first data computation unit is adapted to obtain a key, according to the subscriber data to be stored, and obtain an ID of a DHT node close to the key and selected for storing master data of subscriber data corresponding to the key.

The second data computation unit is adapted to select DHT nodes for storing the divided backup data, according to a first rule, a second rule, a third rule, or a fourth rule.

The first rule specifically is that: the $i^{th}$ backup data (i is an integer and $1 \leq i \leq K$) is divided into L/K portions, and the $j^{th}$ data piece (j is an integer and $1 \leq j \leq L/K$) is selected to be stored in the $i \times j^{th}$ adjacent node of the node storing the master data among currently online nodes.

The second rule specifically is that: the $i^{th}$ backup data (i is an integer and $1 \leq i \leq K$) is divided into L/K portions, and the $j^{th}$ data piece (j is an integer and $1 \leq j \leq L/K$) is selected to be stored in the i×j+N$^{th}$ adjacent node of the node storing the master data among currently online nodes, and N is an integer greater than zero.

The third rule specifically is that: the i$^{th}$ backup data (i is an integer and $1 \leq i \leq K$) is divided into L/K portions, and the j$^{th}$ data piece (j is an integer and $1 \leq j \leq L/K$) has a key range of [Djl~Djh] and is selected to be stored in a node whose ID is close to a "key=[Djl~Djh]+i×j×HashSpace/(K×L+1)" among currently online nodes.

The fourth rule specifically is that: the i$^{th}$ backup data (i is an integer and $1 \leq i \leq K$) is divided into L/K portions, and the j$^{th}$ data piece (j is an integer and $1 \leq j \leq L/K$) has a key range of [Djl~Djh] and is selected to be stored in a node whose ID is close to a "key=[Djl~Djh]+N+i×j×HashSpace/(K×L+1)" among currently online nodes, and N is an integer greater than zero.

The sending and storage unit is adapted to store the master data in the node selected for storing the master data, and, respectively, send the K×L/K divided backup data pieces to K×L/K DHT nodes.

The data storage unit 53 further includes a determination unit.

The determination unit is adapted to receive return messages from the DHT nodes receiving the backup data pieces. If the number of the received return messages is larger than W, the storage succeeds. W is an integer and $1 \leq W \leq L$.

Figure 9:
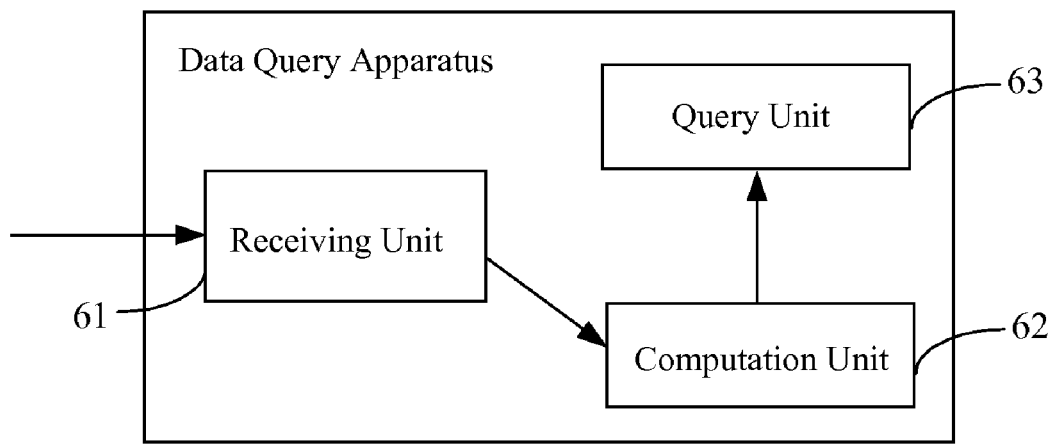
FIG. 9 is a schematic view of an apparatus for querying data, according to an embodiment of the present invention.

An apparatus for querying subscriber data in a communication network is also provided in an embodiment of the present invention. Referring to FIG. 9, the apparatus includes a receiving unit 61, a computation unit 62, and a query unit 63.

The receiving unit 61 is adapted to receive a request for querying subscriber data.

The computation unit 62 is adapted to obtain a key, according to the request, and obtain information about DHT nodes storing the subscriber data, according to the key.

The query unit 63 is adapted to find subscriber data corresponding to the key, according to the information about the DHT nodes.

The computation unit 62 includes a second computation unit.

The second computation unit is adapted to obtain an ID of a DHT node close to the key and storing master data of subscriber data corresponding to the key, and obtain IDs of DHT nodes storing the backup data, according to the ID of the DHT node storing the master data, according to a first rule, a second rule, a third rule, or a fourth rule.

The first rule specifically is that: the i$^{th}$ backup data (i is an integer and $1 \leq i \leq K$) is divided into L/K portions, and the i×j$^{th}$ adjacent node of the node storing the master data stores the j$^{th}$ data piece (j is an integer and $1 \leq j \leq L/K$) of the i$^{th}$ backup data.

The second rule specifically is that: the i$^{th}$ backup data (i is an integer and $1 \leq i \leq K$) is divided into L/K portions, and the i×j+N$^{th}$ adjacent node of the node storing the master data stores the j$^{th}$ data piece (j is an integer and $1 \leq j \leq L/K$) of the i$^{th}$ backup data, and N is an integer greater than zero.

The third rule specifically is that: the i$^{th}$ backup data (i is an integer and $1 \leq i \leq K$) is divided into L/K portions, the j$^{th}$ data piece (j is an integer and $1 \leq j \leq L/K$) has a key range of [Djl~Djh], and a node whose ID is close to a "key=[Djl~Djh]+i×j×HashSpace/(K×L+1)" in the current DHT overlay network stores the j$^{th}$ data piece (j is an integer and $1 \leq j \leq L/K$) of the i$^{th}$ backup data.

The fourth rule specifically is that: the i$^{th}$ backup data (i is an integer and $1 \leq i \leq K$) is divided into L/K portions, the j$^{th}$ data piece (j is an integer and $1 \leq j \leq L/K$) has a key range of [Djl~Djh], and a node whose ID is close to a "key= [Djl~Djh]+N+i×j×HashSpace/(K×L+1)" in the current DHT overlay network stores the j$^{th}$ data piece (j is an integer and $1 \leq j \leq L/K$) of the i$^{th}$ backup data, and N is an integer greater than zero.

The query unit 63 includes a selection unit and a determination unit.

The selection unit is adapted to select x nodes from the node storing the master data and the nodes storing the backup data, and send a request for querying subscriber data to the x nodes (x is an integer and $1 \leq x \leq K+1$).

The determination unit is adapted to receive return messages from the DHT nodes receiving the request for querying subscriber data. If the number of the received return messages is larger than R, the query succeeds, and the determination unit then compares subscriber data in the return messages obtained by the query, uses the latest subscriber data as a query result, and sends the query result. R is an integer and $1 \leq R \leq K+1$.

In the query unit 63, the information about the nodes includes information about nodes storing master data and backup data.

The query unit 63, the receiving unit 61, and the computation unit 62 belong to the same node or are respectively located at different nodes. Alternatively, the query unit 63 is located at the node storing the master data or at the node storing the backup data.

Figure 10:
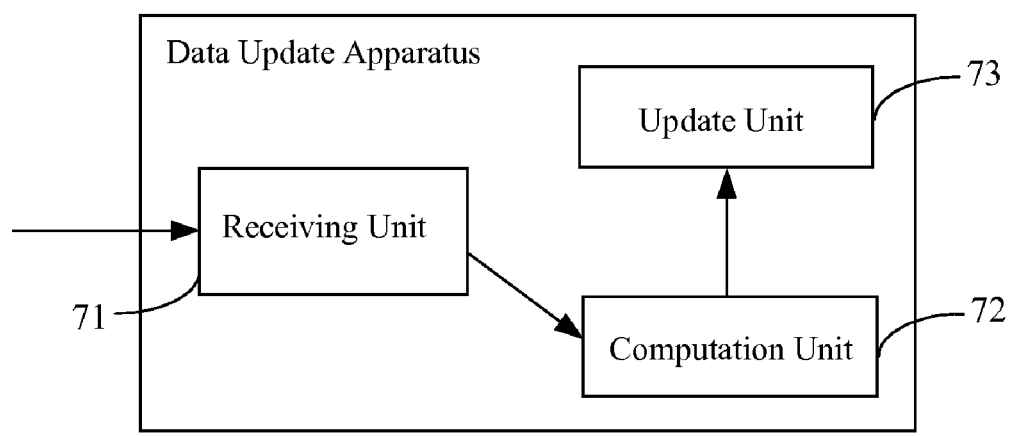
FIG. 10 is a schematic view of an apparatus for updating data, according to an embodiment of the present invention.

An apparatus for updating subscriber data in a communication network is also provided in an embodiment of the present invention. Referring to FIG. 10, the apparatus includes a receiving unit 71, a computation unit 72, and an update unit 73.

The receiving unit 71 is adapted to receive a request for updating subscriber data.

The computation unit 72 is adapted to obtain a key, according to the request, and obtain information about DHT nodes storing the subscriber data, according to the key.

The update unit 73 is adapted to update subscriber data corresponding to the key, according to the information about the DHT nodes.

The computation unit 72 includes a second computation unit.

The second computation unit is adapted to obtain an ID of a DHT node close to the key and storing master data of subscriber data corresponding to the key, and obtain IDs of DHT nodes storing the backup data, according to the ID of the DHT node storing the master data, according to a first rule, a second rule, a third rule, or a fourth rule.

The first rule specifically is that: the i$^{th}$ backup data (i is an integer and $1 \leq i \leq K$) is divided into L/K portions, and the i×j$^{th}$ adjacent node of the node storing the master data stores the j$^{th}$ data piece (j is an integer and $1 \leq j \leq L/K$) of the i$^{th}$ backup data.

The second rule specifically is that: the i$^{th}$ backup data (i is an integer and $1 \leq i \leq K$) is divided into L/K portions, and the i×j+N$^{th}$ adjacent node of the node storing the master data stores the j$^{th}$ data piece (j is an integer and $1 \leq j \leq L/K$) of the i$^{th}$ backup data, and N is an integer greater than zero.

The third rule specifically is that: the i$^{th}$ backup data (i is an integer and $1 \leq i \leq K$) is divided into L/K portions, the j$^{th}$ data piece (j is an integer and $1 \leq j \leq L/K$) has a key range of [Djl~Djh], and a node whose ID is close to a "key= [Djl~Djh]+i×j×HashSpace/(K×L+1)" in the current DHT overlay network stores the j$^{th}$ data piece (j is an integer and $1 \leq j \leq L/K$) of the i$^{th}$ backup data.

The fourth rule specifically is that: the i$^{th}$ backup data (i is an integer and $1 \leq i \leq K$) is divided into L/K portions, the j$^{th}$ data piece (j is an integer and $1 \leq j \leq L/K$) has a key range of

[Djl~Djh], and a node whose ID is close to a "key=[Djl~Djh]+N+i×j×HashSpace/(K×L+1)" in the current DHT overlay network stores the $j^{th}$ data piece (j is an integer and $1 \leq j \leq L/K$) of the $i^{th}$ backup data, and N is an integer greater than zero.

The update unit 73 includes a selection unit and a determination unit.

The selection unit is adapted to select x nodes from the node storing the master data and the nodes storing the backup data, and send a request for updating subscriber data to the x nodes (x is an integer and $1 \leq x \leq K+1$).

The determination unit is adapted to receive return messages from the DHT nodes receiving the request for updating subscriber data. If the number of the received return messages is larger than W, the update succeeds. W is an integer and $1 \leq W \leq K+1$.

In the update unit 73, the information about the nodes includes information about nodes storing master data and backup data.

The update unit 73, the receiving unit 71, and the computation unit 72 belong to the same node or are, respectively, located at different nodes. Alternatively, the update unit 73 is located at the node storing the master data or at the node storing the backup data.

The methods and apparatuses for storing, querying and updating data provided in one embodiment of present invention can achieve distributed storage of telecommunication subscriber data, which significantly improves the parallel recovery by the nodes in the DHT overlay network, reduces the system resources preserved for the maintenance work of the DHT overlay network, improves the robustness of the whole subscriber data storage system, and reduces the unnecessary messages between the nodes in the DHT overlay network.

Finally, it should be understood that the above embodiments are only used to explain, but not to limit the technical solution of the present invention. Despite the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A method for processing subscriber data in a communication network based on a Distributed Hash Table (DHT), comprising:
   receiving, by a first node in a DHT overlay network, subscriber data to be stored;
   dividing the subscriber data into L/K portions, wherein the subscriber data to be stored is regarded as backup data and L is greater than or equal to a ratio of a node working bandwidth of a second node to a node recovering bandwidth for data recovery of the second node in the DHT overlay network, and K is a total number of backup data and is an integer greater than zero; and
   sending master data and the K×L/K divided backup data respectively, wherein the subscriber data to be stored is regarded as the master data.

2. The method according to claim 1, wherein the second node is the first node or another node in the DHT overlay network.

3. The method according to claim 1, further comprising: respectively sending the master data and the K×L/K divided backup data to 1+K×L/K DHT nodes, wherein this step further comprises: obtaining a key according to the subscriber data to be stored, obtaining an ID of a DHT node close to the key, wherein the DHT node is selected for storing master data of subscriber data corresponding to the key;
   selecting DHT nodes for storing the divided backup data according to a rule; and
   storing the master data on the node selected for storing the master data, and respectively sending the K×L/K divided backup data pieces to K×L/K DHT nodes.

4. The method according to claim 3, wherein the rule specifically is that: an i-th backup data is divided into L/K portions, and a j-th data piece is selected to be stored on an i×j-th adjacent node of the node storing the master data among currently online nodes: i and j are integers, $1 \leq i \leq K$, and $1 \leq j \leq L/K$; or
   the rule specifically is that: an i-th backup data is divided into L/K portions, and a j-th data piece is selected to be stored on an i×j+N-th adjacent node of the node storing the master data among currently online nodes: i and j are integers, $1 \leq i \leq K$, $1 \leq j \leq L/K$, and N is an integer greater than zero; or
   the rule specifically is that: an i-th backup data is divided into L/K portions, a j-th data piece has a key range of [Djl~Djh] and is selected to be stored on a node whose ID is close to a "key=[Djl~Djh]+i×j×HashSpace/(K×L+1)" among currently online nodes: i and j are integers, $1 \leq i \leq K$, and $1 \leq j \leq L/K$; or
   the rule specifically is that: an i-th backup data is divided into L/K portions, a j-th data piece has a key range of [Djl~Djh] and is selected to be stored on a node whose ID is close to a "key=[Djl~Djh]+N+i×j×HashSpace/(K×L+1)" among currently online nodes: i and j are integers, $1 \leq i \leq K$, $1 \leq j \leq L/K$, and N is an integer greater than zero.

5. The method according to claim 3, wherein the step of respectively sending the master data and the K×L/K divided backup data to the 1+K×L/K DHT nodes further comprises:
   receiving return messages from the DHT nodes receiving the backup data pieces, wherein if the number of the received return messages is larger than W, the storage succeeds; W is an integer and $1 \leq W \leq L+1$.

6. The method according to claim 1, further comprising:
   receiving, by the first node in a DHT overlay network, a request for querying subscriber data;
   obtaining a key according to the request and obtaining information about DHT nodes storing the subscriber data according to the key; and
   finding the subscriber data corresponding to the key according to the information about the DHT nodes.

7. The method according to claim 6, wherein the step of obtaining the information about the DHT nodes storing the subscriber data according to the key further comprises:
   obtaining an ID of a DHT node closed to the key, wherein the DHT node stores master data of the subscriber data corresponding to the key; and
   obtaining IDs of DHT nodes storing the backup data according to the ID of the DHT node storing the master data.

8. The method according to claim 6, wherein the step of finding the subscriber data corresponding to the key according to the information about the DHT nodes further comprises:
   selecting x nodes from the node storing the master data and the nodes storing the backup data, and sending a request for querying subscriber data to the x nodes, wherein x is an integer and $1 \leq x \leq K+1$;
   receiving return messages from the DHT nodes receiving the request for querying subscriber data, wherein if the number of the received return messages is larger than R, the query succeeds: wherein R is an integer and $1 \leq R \leq K+1$; and comparing the subscriber data in the return messages obtained by the query, using the latest data as a query result, and sending the query result.

9. The method according to claim 6, wherein the information about the nodes comprises information about nodes storing master data and information about nodes storing backup data.

10. The method according to claim 6, wherein the step of finding the subscriber data corresponding to the key according to the information about the DHT nodes is
performed by the first node; or performed by the node storing the master data after the first node notifies the node storing the master data; or performed by the nodes storing the backup data after the first node notifies the nodes storing the backup data.

11. The method according to claim 1, further comprising:
receiving, by the first node in a DHT overlay network, a request for updating subscriber data;
obtaining a key according to the request and obtaining information about DHT nodes storing the subscriber data according to the key; and
updating the subscriber data corresponding to the key according to the information about the DHT nodes.

12. An apparatus for processing subscriber data in a communication network based on a Distributed Hash Table (DHT), comprising:
a receiving unit adapted to receive subscriber data to be stored;
a data division unit adapted to divide the subscriber data to be stored into L/K portions, wherein the subscriber data to be stored is regarded as backup data and the L is greater than a ratio of a node working bandwidth of a second node to a node recovering bandwidth for data recovery of the second node in the DHT overlay network, and the K is a total number of backup data and is an integer greater than zero; and
a data storage unit adapted to use the subscriber data to be stored as master data and respectively send the master data and K×L/K divided backup data to 1+K×L/K DHT nodes.

13. The apparatus according to claim 12, wherein the second node is the first node or another node in the DHT overlay network.

14. The apparatus according to claim 12, wherein the data storage unit further comprises:
a first data computation unit adapted to obtain a key according to the subscriber data to be stored, and obtain an ID of a DHT node close to the key, the DHT node is selected for storing master data of subscriber data corresponding to the key;
a second data computation unit adapted to select DHT nodes for storing the divided backup data; and
a sending and storage unit adapted to store the master data on the node selected for storing the master data, and respectively send the K×L/K divided backup data pieces to K×L/K DHT nodes.

15. The apparatus according to claim 12, wherein the data storage unit further comprises:
a determination unit adapted to receive return messages from the DHT nodes receiving the backup data pieces, wherein if the number of the received return messages is larger than W, the storage succeeds; W is an integer and $1 \leq W \leq L$.

16. The apparatus according to claim 12, further comprising:
a computation unit adapted to obtain a key according to the request and obtain information about DHT nodes storing the subscriber data according to the key.

17. The apparatus according to claim 16, further comprising:
a query unit adapted to find subscriber data corresponding to the key according to the information about the DHT nodes; or
an update unit adapted to update subscriber data corresponding to the key according to the information about the DHT nodes.

18. The apparatus according to claim 16, wherein the computation unit comprises:
a second computation unit adapted to obtain an ID of a DHT node close to the key, wherein the DHT node stores master data of the subscriber data corresponding to the key, and obtain IDs of DHT nodes storing the backup data according to the ID of the DHT node storing the master data.

19. The apparatus according to claim 16, wherein the query unit comprises:
a selection unit adapted to select x nodes from the node storing the master data and the nodes storing the backup data, and send a request for querying subscriber data to the x nodes: x is an integer and $1 \leq x \leq K+1$; and
a determination unit adapted to receive return messages from the DHT nodes receiving the request for querying subscriber data, wherein if the number of the received return messages is larger than R, the query succeeds, and the determination unit then compares the subscriber data in the return messages obtained by the query, uses the latest subscriber data as a query result, and sends the query result; R is an integer and $1 \leq R \leq K+1$.

20. A communication equipment, comprising at least one of the following apparatuses:
an apparatus for processing subscriber data in a communication network based on a Distributed Hash Table (DHT),
an apparatus for querying subscriber data in a communication network based on a DHT, and
an apparatus for updating subscriber data in a communication network based on a DHT;
wherein the apparatus for storing subscriber data in a communication network based on a DHT comprises:
a receiving unit adapted to receive subscriber data to be stored;
a data division unit adapted to divide the subscriber data to be stored into L/K portions, wherein the subscriber data to be stored is regarded as backup data and the L is greater than a ratio of a node working bandwidth of a second node to a node recovering bandwidth for data recovery of the second node in the DHT overlay network, and the K is a total number of backup data and is an integer greater than zero; and
a data storage unit adapted to send the master data and K×L/K divided backup data to 1+K×L/K DHT nodes respectively, the subscriber data to be stored is regarded as master data;
the apparatus for querying subscriber data in a communication network based on a DHT comprises:
a receiving unit adapted to receive a request for querying subscriber data;
a computation unit adapted to obtain a key according to the request and obtain information about DHT nodes storing the subscriber data according to the key; and a query unit adapted to find subscriber data corresponding to the key according to the information about the DHT nodes; and the apparatus for updating subscriber data in a communication network based on a DHT comprises:

a receiving unit adapted to receive a request for updating subscriber data;

a computation unit adapted to obtain a key according to the request and obtain information about DHT nodes storing the subscriber data according to the key; and an update unit adapted to update subscriber data corresponding to the key according to the information about the DHT nodes.

* * * * *